Figure 1:
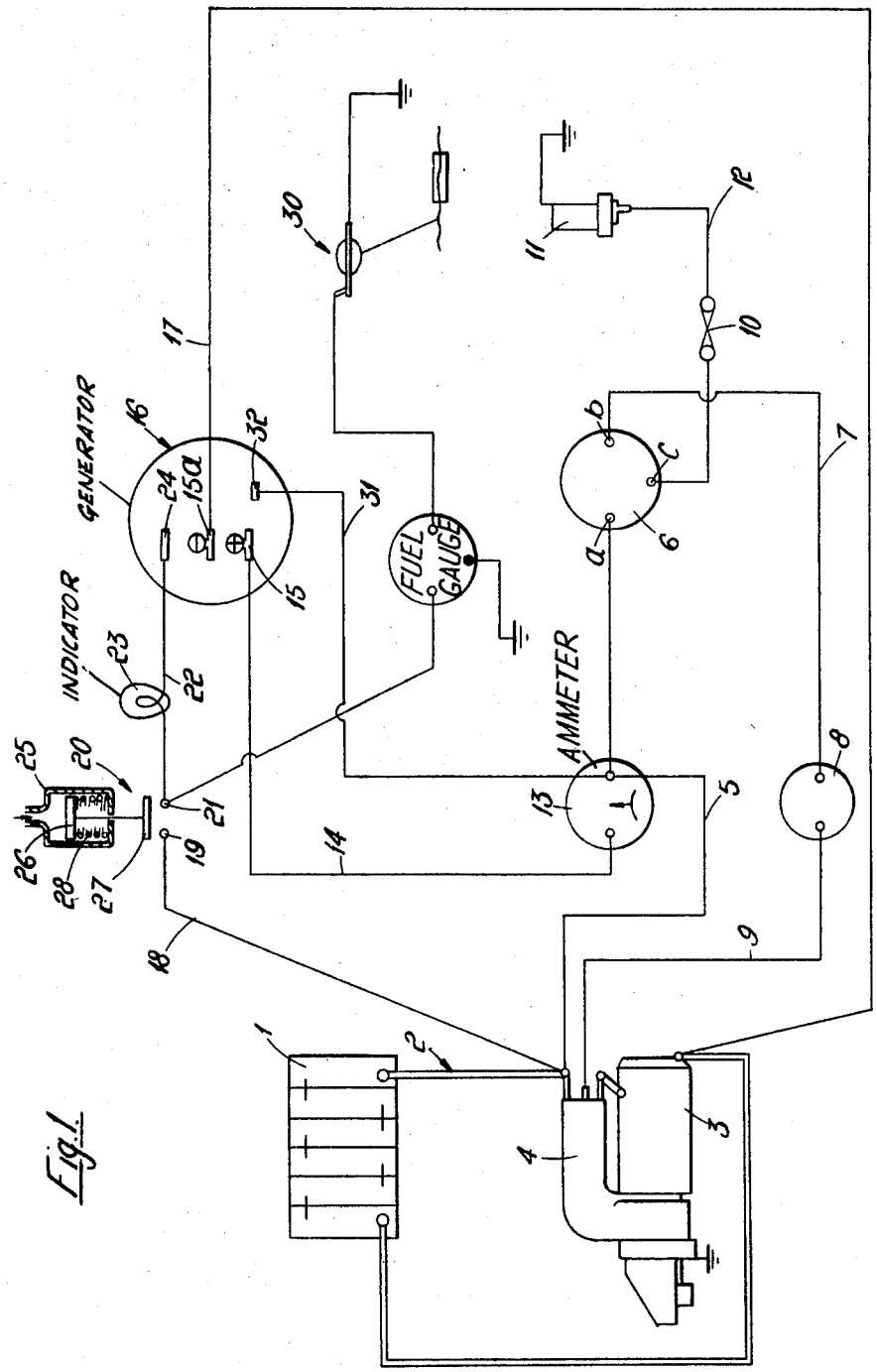

United States Patent
Belford

[15] 3,648,234
[45] Mar. 7, 1972

[54] AUTOMATICALLY ACTUATED VEHICLE INDICATOR

[72] Inventor: Bertram C. Belford, Balsall Common, Warwickshire, Great Britain

[73] Assignee: Massey-Ferguson Services N.V., Curacao, Netherlands

[22] Filed: June 11, 1969

[21] Appl. No.: 832,260

[30] Foreign Application Priority Data

June 28, 1968 Great Britain......................30,830/68

[52] U.S. Cl..............................................340/62, 340/52 F
[51] Int. Cl. ......................................................G08b 7/00
[58] Field of Search..........................340/62, 60, 52 F, 248 Y

[56] References Cited

UNITED STATES PATENTS

| 1,444,403 | 2/1923 | Varley | 340/52 |
|---|---|---|---|
| 2,870,753 | 1/1959 | Shuck et al. | 340/60 X |
| 3,509,529 | 4/1970 | Utter | 340/60 X |
| 1,375,736 | 4/1921 | Schwarz | 340/248 Y |
| 2,511,631 | 6/1950 | Gordon | 340/52 F |
| 3,105,222 | 9/1963 | Adler | 340/62 |

Primary Examiner—John W. Caldwell
Assistant Examiner—Howard S. Cohen
Attorney—Gerhardt, Greenlee & Farris

[57] ABSTRACT

A vehicle electrical circuit includes a battery, a generator warning lamp and a generator in series. A normally open switch in the circuit closes in response to engine oil pressure to light the lamp which is extinguished when the generator field coil voltage equals battery voltage. A fuel gauge is also activated by the switch. This enables the electrical instruments to be automatically switched on and off by operation of the engine.

1 Claims, 2 Drawing Figures

AUTOMATICALLY ACTUATED VEHICLE INDICATOR

This invention relates to an electrical control circuit for the electrical generating system of an internal combustion engine, especially but not exclusively of an automotive vehicle.

In electrical generating systems for internal combustion engines and utilizing engine-driven generators having field coils which are not self-exciting, a field coil auxiliary supply circuit must be provided in the control circuit for the system. Such electrical control circuits including a field coil auxiliary supply circuit will hereinafter be referred to as "control circuits of the type aforesaid."

It is known in control circuits of the type aforesaid to employ a warning light to indicate when the field coil auxiliary supply of an electrical generator is switched on. When the generator is driven by a spark-ignition engine, the field coil auxiliary supply can be switched on and off by the same switch as the ignition circuit, because the latter has to be energized to enable the engine to run, and normally has to be deenergized to stop the engine. When the engine is a compression-ignition engine, there is normally no electrical circuit which remains live while the engine is running and is switched off when the engine stops. Hence the field coil auxiliary circuit generally has to be energized and deenergized individually.

According to the present invention there is provided, in an electrical generating system for an internal combustion engine, a control circuit of the type aforesaid in which the field coil auxiliary supply circuit includes an engine-speed responsive switch operable to energize said supply circuit when the speed of the engine is above a predetermined value.

Further according to the present invention there is provided in an electrical generating system of an internal combustion engine, a control circuit of the type aforesaid in which the field coil auxiliary supply circuit includes an engine-speed responsive switch which operates in response to a signal emitted by the engine only when the speed of the latter is above a predetermined value and effects energization of said supply circuit.

Conveniently, the signal is in the form of a pressure of lubricating oil, although it may be a speed signal, a signal derived from inlet manifold pressure, exhaust manifold pressure, or fuel pressure.

Preferably, a generator output indicator is connected in series with said switch. Said indicator is conveniently a warning light.

Figure 2:
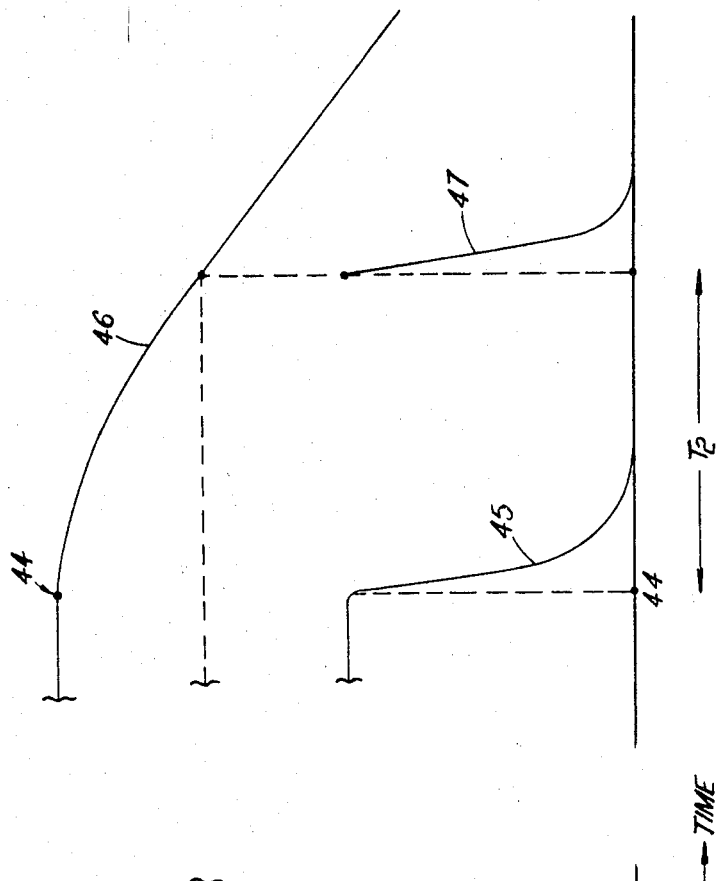

An embodiment of the invention will now be described, by way of example, with reference to the accompanying drawings, in which:

FIG. 1 shows, diagrammatically, an electrical generating system according to the present invention and associated circuitry for use in a diesel automotive engine; and FIG. 2 is a graph showing the relationship between voltage, time and oil pressure in the system according to FIG. 1.

Referring to FIG. 1, an electrical storage battery or accumulator 1 is connected, in a starting circuit indicated generally at 2, to a starter motor 3, a starter motor switch 4 being inserted for control purposes.

The starting circuit 2 includes a lead 5 connected to a terminal a of a heater/starter switch 6, and a lead 7 connects a terminal b of the switch 6 to a safety switch 8 which is closed only when the vehicle transmission is in neutral. A lead 9 joins the safety switch to a solenoid (not shown) in the starter motor switch 4. A third terminal c in the switch 6 is connected, through a fuse 10, to a starting aid 11 by a lead 12. The starting aid 11 is a conventional electrical device for assisting the engine to fire in cold weather.

The electrical generating system comprises an ammeter 13 connected in series by leads 14 and 5 between one output terminal 15 of a generator and the battery 1. A lead 17 connects the other output terminal 15a of the generator to the battery 1 so as to complete the circuit. The generator 16 is a known type of alternator including an appropriate rectifier and regulator so as to produce the necessary DC output. A battery voltage-sensing lead 31 is connected at one end to the battery voltage at, for example, the ammeter 13 and at the other end to a battery voltage-sensing terminal 32 which is connected to the regulator in the generator 16.

A control circuit for the generating system includes a lead 18 from the battery 1 which is connected to one contact 19 of an oil pressure sensing switch 20. Another contact 21 is connected by a lead 22, through a charge warning light 23, to a field coil auxiliary supply terminal 24 on the generator. The oil pressure switch 20 comprises a cylinder 25 which is hydraulically connected to the lubricating oil pump of the engine (not shown) and which contains a piston 26. The piston 26 is joined to a bridging piece 27 which is adapted to electrically connect the two contacts 19 and 21 of the switch 20. A spring 28 urges the piston 26 and the bridging piece 27 in a direction away from the contacts 19 and 21.

The sequence of events in operation of the circuitry described above is as follows. The safety switch 8 being closed, the heater/starter switch 6 is turned to operate the starting aid 11 for a few seconds and is then immediately turned to "start," thereby energizing the starter motor 3. As the engine is cranked by the starter motor 3, the engine lubricating oil pump is turned and oil under pressure closes the switch 20 thus energizing the generator field coil through the auxiliary supply circuit, and causing the warning light 23 to glow. When the engine has fired, its speed builds up and the generator voltage increases to a value where it generates its own field supply.

The generator incorporates a regulator for adjusting the generator output rate in response to changes in the battery voltage, which voltage is continuously monitored by the battery voltage-sensing lead 31 at the terminal 32. At about the speed at which the generator commences to generate its own field supply, the opposing voltage of the generator's self-generated field supply at the warning light 23 is approximately equal to the battery voltage, and the light is extinguished. The means by which the battery voltage is compared to the charge rate to adjust the latter is conventional and is therefore not described in detail. The time for which the warning light 23 is lit during starting is generally less than a second but it is sufficient to indicate that the light itself is functioning.

When the fuel supply to the diesel engine is stopped the engine speed falls rapidly and the generator very soon reaches a speed at which it cannot supply its own field. The auxiliary field coil supply now takes over, with the result that the voltage on the battery side of the warning light 23 is now greater than that on the generator side and the light 23 comes on, and remains on until the engine oil pressure falls to a level which allows the spring 28 to disengage the bridge piece 27 from the contacts 19 and 21. When the switch 20 is opened the light 23 goes out once again. The period during which the warning light 23 is lit during stopping is approximately 4 seconds and this is a further indication that the warning light bulb is functioning.

Thus switch 20 is held closed by engine oil pressure while the engine is running. If the generator 16 should fail during this time, its field supply will decrease, whereupon warning light 23 will glow to indicate the malfunction.

FIG. 2 represents a graph of oil pressure and voltage on a time base. The shape of the curves are illustrative and they may vary considerably from engine to engine and from generator to generator. Curve 40 represents the rise of lubrication oil pressure in the engine from the time when the engine is first cranked by the starter motor 3. The pressure rises steadily as the engine speed rises to a level at which a relieve valve operates, at which time the oil pressure becomes steady at a predetermined level. At a predetermined pressure P1, determined by the strength of the spring 28 in the oil pressure switch 25, the latter closes and energizes the field coils of the generator through the auxiliary field coil supply circuit. The voltage curve 41 indicates how the voltage in the field coils rises due to the auxiliary supply. At point 42 in time, the output voltage 43 of the generator builds up considerably and eventually reaches the level of the battery voltage applied to the field through the auxiliary supply circuit, i.e., it merges with the curve 41. At this point the warning light 23 goes out. Therefore, the length of time T1 is the flash of less than a second referred to above.

FIG. 2 is broken along the abscissa to indicate the indeterminate time during which the engine is running and performing its duty.

At a point 44, the engine is stopped and the output voltage from the generator dies away very rapidly according to curve 45. At this point, there is an unbalanced voltage applied by the battery and not compensated by the output from the generator, and the light 23 comes on. The engine oil pressure, if the engine is in good condition, decreases very much more slowly, curve 46, and the oil pressure eventually drops to a level P1 where the switch 25 opens, thus cutting off the battery voltage to the light 23 and extinguishing it. Subsequently, the voltage in the field coils falls very rapidly as indicated by curve 47. In this case, it will be seen that the decrease of the engine oil pressure is a factor which gives a flash T2 of the warning light, which flash is considerably longer than the flash of less than a second at starting.

Fuel-gauging apparatus 30, can be supplied from the terminal 21, as can other electrical services required, only while the engine is running.

Thus this invention provides means to automatically activate the vehicle instruments when the engine is running and to automatically deactivate these instruments when the engine stops. This eliminates any manual switch operations and the possibility of forgetting to switch off the instruments which would discharge the battery.

While the switch 20 is described above as being responsive to changes in engine lubricating oil pressure which pressure is related to the engine speed, the switch 20 may be responsive to changes in any other condition of the engine which is related to the engine speed such as inlet manifold depression, exhaust manifold pressure, or fuel pressure. Moreover, the switch 20 may be responsive to changes in a signal emitted by an engine tachometer.

I claim:

1. In combination with a vehicle having an engine and an electrical system including a vehicle function indicator, a source of current and a circuit interconnecting the indicator and source, switch means in the circuit for making and breaking the circuit between the indicator and source, said circuit including a generator coil and a lead interconnecting the switch means and the generator coil through the indicator, the switch means being responsive to engine speed above a predetermined speed to make the circuit and operate the indicator by current at a voltage supplied by said source, said switch means being responsive to engine speed below said predetermined speed to break the circuit and thereby disconnect said indicator from said source and deactivate the indicator, said generator being connected to said engine so that it will produce a voltage in said coil equal to and opposing said source voltage at a second predetermined engine speed higher than the first predetermined engine speed whereby said indicator is operated when said first predetermined speed is reached and is deactivated when said second predetermined speed is reached.

* * * * *